M. WILBUSCHEWITSCH.
APPARATUS FOR CONVERTING FATS, OILS, AND FISH OILS INTO LIKE BODIES OF HIGHER MELTING POINTS.
APPLICATION FILED JAN. 3, 1912.
1,079,278.
Patented Nov. 18, 1913.
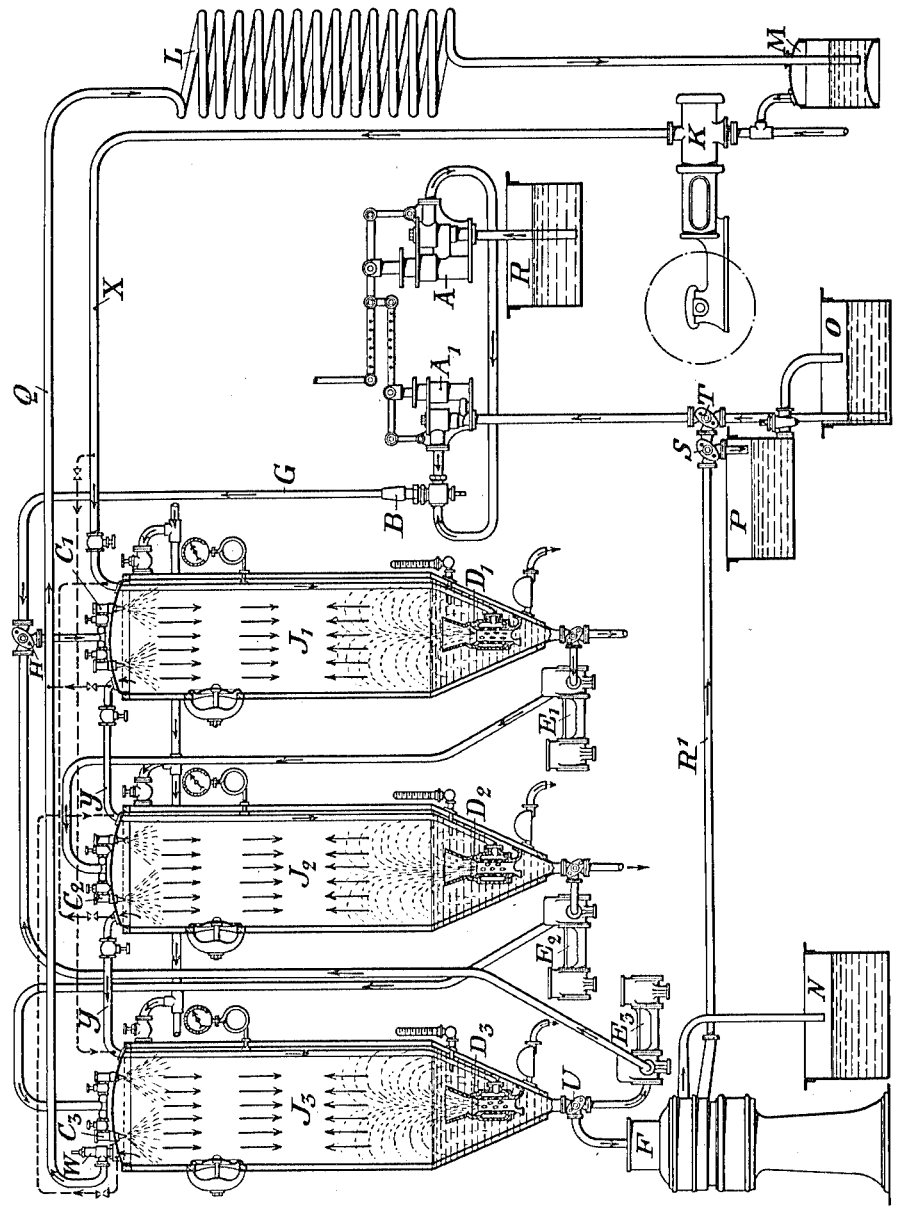

UNITED STATES PATENT OFFICE.

MOSE WILBUSCHEWITSCH, OF NISCHNINOVGOROD, KANAVINO, RUSSIA.

APPARATUS FOR CONVERTING FATS, OILS, AND FISH-OILS INTO LIKE BODIES OF HIGHER MELTING-POINTS.

1,079,278.  Specification of Letters Patent.  Patented Nov. 18, 1913.

Original application filed January 12, 1911, Serial No. 602,322. Divided and this application filed January 3, 1912. Serial No. 669,177.

*To all whom it may concern:*

Be it known that I, MOSE WILBUSCHE-WITSCH, a subject of the Czar of Russia, and resident of Nischninovgorod, Kanavino, Russia, have invented certain new and useful Improvements in Apparatus for Converting Fats, Oils, and Fish-Oils into like Bodies of Higher Melting-Points, of which the following is a specification.

The present invention relates to an apparatus for cheaply and simply converting fats, oils, fish oils and the like into fats of higher melting points, that is to say an apparatus for obtaining fats and oils of comparatively higher value from the cheaper kinds, and comprises means for mixing the fat or oil with a catalyst very intimately and directing against this mixture in a very finely subdivided state in an autoclave under pressure, hydrogen or a gas containing hydrogen. By this means a remarkably intimate contact of the hydrogen with the finely subdivided intimate mixture of fat and catalyst is obtained. And by means of the apparatus a comparatively low temperature suffices for the conversion of the fat.

The invention consists further of the combination of parts comprising a reservoir for the fat, and an autoclave for the catalyst, and means for mixing the fat and catalyst, and means for separating the oil from the catalyst, coöperatively connected to obtain oil of higher melting point than the oil or fat initially introduced into the apparatus.

The accompanying drawing represents a vertical longitudinal section through the whole apparatus.

Referring to the drawings, the vessel R is adapted to contain the fat to be treated and the vessel O is adapted to contain the catalyst which is a fluid resembling emulsion. Differentially connected pumps A A' feed the oil and the catalyst in the mixing device B in which an intimate mixture of the oil and the catalyst is obtained. This mixture passes through a pipe G and the valve H into an autoclave J' which is provided with a double-heating jacket and shaped conically at its lower part. At the upper part, the autoclave is provided with a spraying device C' which consists of a plurality of spraying nozzles which are so arranged that the oil and catalyst are uniformly scattered in finely subdivided condition throughout the whole inner space of the autoclave. These spraying nozzles are preferably interchangeable for the purpose of facilitating the cleaning of the same. A compressor K forces hydrogen which is used for the reduction into the autoclave, the hydrogen passing through a pipe, under a pressure of about 9 atmospheres. The pipe X extends from the upper part of the autoclave downwardly to the lower end of the same and is provided at its lower end in the conical lower part of the autoclave with an admission nozzle D' which is preferably constructed on the injector principle and provided with an interior perforated tubular portion having an outwardly-flaring nozzle at its upper end and a jacket surrounding the tube and connected with the pipe X. By this arrangement an extremely intimate contact and an emulsification of the oil mixture with the hydrogen is achieved on the countercurrent and continuous current principle. The autoclave is heated to between 100–160° centigrade according to the nature of the oil under treatment. The reduction by the hydrogen begins at the upper part of the autoclave. The partially reduced oil mixture collects in the conical part of the autoclave and is sprayed in the form of a fountain through the autoclave by the incoming hydrogen, whereby the reduction is accelerated. The mixture is then pumped by pump E' into the second autoclave $J^2$. The hydrogen enters this autoclave through pipe Y and the action of the first autoclave is repeated. Any number of such autoclaves can be arranged in series or parallel to each other in accordance with the extent of reduction required. It is generally suitable to use one autoclave for each increase of melting point by 15° C. When the oil has attained the desired melting point which is ascertained by samples withdrawn from the autoclaves, the oil mixture is withdrawn through the valve U into the centrifugal apparatus F.

The centrifugal action of this apparatus separates the oil from the catalyst. The finished reduced oil flows into the reservoir N while the catalyst is returned through the pipe R' and valves S and T to the vessels O and P. At first when the catalyst is still quite fresh only a little of it is necessary, 1% may be advantageously used. When, part of said autoclave, an upwardly-directed admission nozzle for gases in the said conical lower part of the autoclave adapted to spray the material collected in said conical lower part back into the body of the autoclave, and means for supplying gases under pressure to said nozzles.

In testimony, that I claim the foregoing as my invention, I have signed my name in presence of two subscribing witnesses.

MOSE WILBUSCHEWITSCH.

Witnesses:
 RODOLPH LOŸ,
 MIKIRTITSCH TER-OGANNESSIAN.